May 19, 1959 J. A. MEYER 2,886,985
GEAR TRANSMISSION
Filed Oct. 6, 1955 2 Sheets-Sheet 1

INVENTOR.
JAMES A. MEYER
BY
ATTORNEYS

May 19, 1959   J. A. MEYER   2,886,985
GEAR TRANSMISSION
Filed Oct. 6, 1955   2 Sheets-Sheet 2
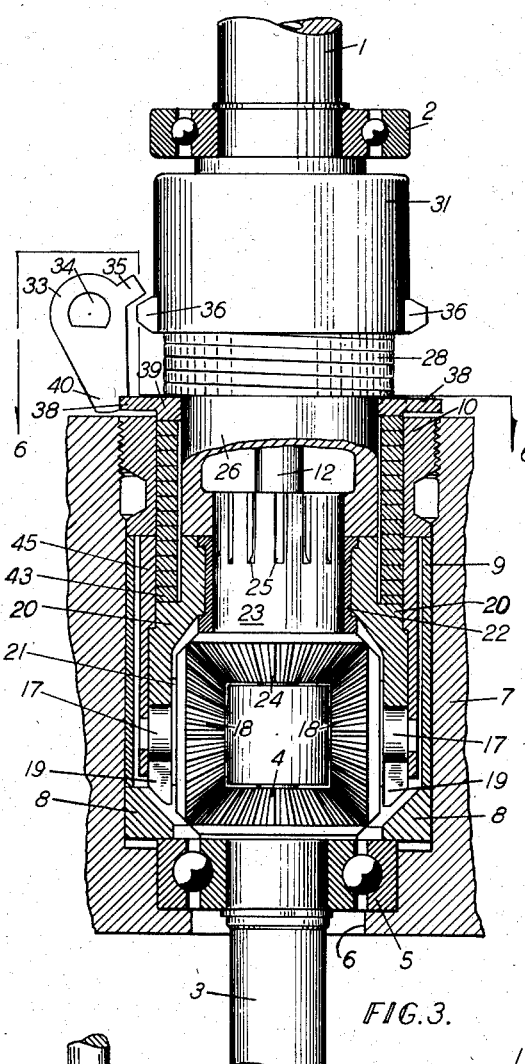
FIG.3.
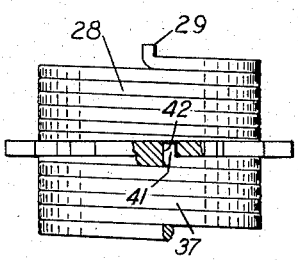
FIG.4.
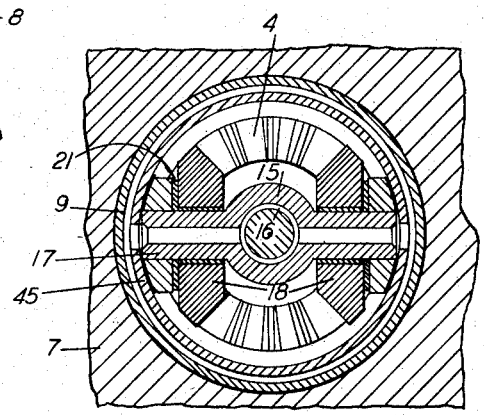
FIG.5.
FIG.6.
INVENTOR.
JAMES A. MEYER
BY
ATTORNEYS United States Patent Office 2,886,985
Patented May 19, 1959

2,886,985

GEAR TRANSMISSION

James A. Meyer, Oshkosh, Wis., assignor to Kiekhaefer Corporation, Cedarburg, Wis., a corporation of Wisconsin Application October 6, 1955, Serial No. 538,826

7 Claims. (Cl. 74—780)

This invention relates to torque transmisison mechanisms and the assembly thereof, and more particularly to a planetary gear shift and drive mechanism providing a forward and reverse drive between drive and driven shafts.

According to the invention a coil clutch-spring is employed with a planetary gear system to selectively connect the planet carrier to the drive shaft for direct drive and to provide a cushioned abutment means to stop rotation of the planet carrier for reverse drive.

The planet carrier is provided with a coil-spring clutch which normally connects the carrier with the drive gear and upon expansion disengages the drive gear and the planetary gear carrier. Complementary portions of the carrier and the gear housing serve to retain or limit expansion of the spring when one end of the spring engages a fixed abutment which effects its expansion and the disengagement of the carrier. Upon full expansion of the spring to the extent allowed, the spring is effectively disposed between the fixed abutment and an abutment of the carrier to prevent further rotation of the carrier for reverse drive. The resilience of the spring provides a gradual or cushioned stoppage of carrier rotation which prevents overloading of other parts of the transmission system.

The drawings furnished herewith illustrate the best mode of carrying out the invention as presently contemplated and set forth hereinafter.

In the drawings:

Fig. 3 is a view similar to Figure 1 partially in section showing the shift mechanism in reverse drive;

Fig. 4 is a side elevation of the clutch springs employed and the reverse control ring with parts thereof broken away and sectioned;

Fig. 5 is a section taken on line 5—5 of Figure 1; and

Fig. 6 is a view taken on line 6—6 of Fig. 3 and showing in elevation the reverse control ring and engagement means for expanding the clutch spring to connect the planetary carrier and the transmission housing to effect reverse drive.

Figures 1, 2:
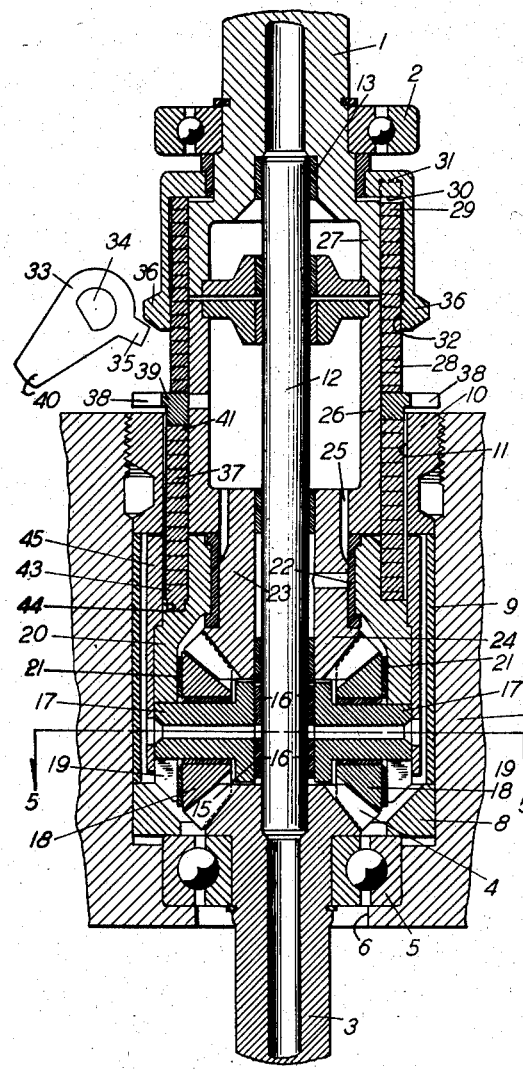
Figure 1 is a sectional view of the transmission showing the shift mechanism of the invention as arranged for direct forward drive.
Fig. 2 is a view similar to Figure 1 partially in section showing the shift mechanism in the "neutral" position.

In carrying out the invention the upper drive shaft 1 is rotatably carried by the ball-bearing unit 2 above and in axial alignment with the driven shaft 3. Driven shaft 3 and the beveled gear 4 formed at the upper end thereof are rotatably supported by the ball-bearing unit 5 which is secured in the lower end of the stepped bore 6 of housing 7 by the collar 8 and sleeve 9 disposed therein. The threaded ring 10 fixed in the upper threaded end of bore 6 holds down sleeve 9 and collar 8 to secure bearing 5 in place in housing 7, and is provided with an inner cylindrical bore 11 which is concentric with the axis of shafts 1 and 3 and the pilot shaft 12 extending therethrough. The lower end of pilot shaft 12 is fixed within and carried by driven shaft 3 and the upper end of shaft 12 is rotatably disposed within the sleeve bearing 13 fixed in the drive shaft 1.

The hub 15 fitted with the bearing sleeves 16 is mounted for rotation on pilot shaft 12 immediately above gear 4 and supports the oppositely projecting spindles 17 which carry the planetary beveled gears 18 meshing with gear 4 of driven shaft 3. The outer end of each spindle extends into the corresponding slot 19 formed in the separate lower ends of the carrier 20 which retains the bearing washers 21 to support the axial thrust of gears 18.

The upper cylindrical end of carrier 20 is rotatably mounted on the sleeve bearing 22 carried by the hub 23 of the drive gear 24. Drive gear 24 is rotatably mounted on pilot shaft 12 and is disposed within carrier 20 to mesh with the planetary beveled gears 18. The upper end of hub 23 of gear 24 and above bearing 22 is formed with the splines 25 to fit within and carry the lower end of the clutch drum 26 having a closed upper end directly supported for rotation on shaft 12 so that drum 26 rotates with gear 24 on pilot shaft 12.

The lower end of drive shaft 1 below ball-bearing unit 2 is enlarged to project over pilot shaft 12 and forms the drive clutch drum 27 having an outer cylindrical dimension equal to the outer dimension of clutch drum 26.

Clutch drums 26 and 27 are disposed in axial alignment and adjacent to each other to carry the drive clutch spring 28 which is wound so that the regular rotation of shaft 1 normally effects the rotation of drum 26 and drive gear 24 in the same direction and so that the release of spring 28 provides the "neutral" condition of the drive transmission as desired.

The upper end 29 of spring 28 is disposed in the hole 30 formed in the upper end of the inverted cup 31. Cup 31 is mounted at its upper end on shaft 1 between bearing unit 2 and the clutch drum 27 and extends downwardly over and encloses the upper portion of spring 28 normally engaging drum 27. The lower inwardly formed rim 32 of cup 31 fits the outer dimensions of spring 28 to support the cup opposite the upper end of clutch drum 26. The larger inner dimension of cup 31 above rim 32 allows the limited expansion of the portion of spring 28 normally otherwise in engagement with drum 26.

The control member 33 mounted on the end of shaft 34 includes the abutment 35 which is adapted to be moved into the path of rotation of the outer projections 36 formed oppositely of rim 32. Shaft 34 is suitably fixed with respect to housing 7 so that upon rotational adjustment and the engagement of projection 36 with abutment 35, the rotation of cup 31 is arrested and the rotation of drum 27 and spring 28 continues only to the extent that the portion of spring 28 between the end 29 thereof and the portion in engagement with drum 27 is expanded out of driving engagement with drum 27. A small portion of spring 28 remaining in frictional engagement with drum 27 maintains the expanded condition of the spring in cup 31 until the projection 36 is released. Cup 31 limits the expansion of the spring so that no damage thereto occurs as when the shifting to "neutral" is performed while shaft 1 is rotating at high speeds.

The securement of the planetary gears 18 against rotation relative to gear 24 which provides the direct drive of gear 4 and shaft 3 is effected by the clutch spring 37 which is wound in the same direction as spring 28 and is mounted below spring 28 on drum 26 and the upper cylindrical portion of carrier 20. According to the invention, spring 37 upon release also effects the securement of carrier 20 against rotation relative to housing 7 as upon engagement of one of the projections 38 of the control ring 39 by the abutment 40 of control member 33. Ring 39 is mounted on drum 26 between springs 28 and 37 and with the upper end 41 of spring 37 fitting in the hole 42 of the ring. The lower end 43 of spring 37 is fitted in the corresponding hole 44 of the carrier 20 so that when the rotation of ring 39 is arrested by abutment 40 the continuing rotation of carrier 20 relative to ring 38 causes spring 37 to expand into engagement with bore 11 of ring 10 and the inner face of the outer sleeve 45 mounted on the carrier.

The lower portion of cylindrical sleeve 45 fits over the lower end of carrier 20 and extends over slots 19 and the ends of spindles 17. The upper end of sleeve 45 is disposed immediately beneath the fixed ring 10 and has an inner diameter equal to bore 11 of ring 10.

The expansion of spring 37 described provides a cushioning of the change in direction of rotation of shaft 3 whenever effected. The invention is intended for use in marine drives including outboard motors where shifting into reverse must often be hastily accomplished. In such applications the full expansion of the spring as limited by the sleeve 45 and the ring 10 provides the desired cushioning against shock which is not otherwise readily provided for.

Release of projection 38 and of ring 39 by rotation of control shaft 34 and control member 33 allows the opposite ends of spring 37 to rotate in the direction in which it is wound and to contract into re-engagement with carrier 20 and drum 26 for direct drive as described previously. The mechanism, not shown, to be employed in rotating control member 33 should bias the member so that the member will allow ring 39 to rotate in reverse.

The parts of the planetary gear drive are easily assembled in the stepped bore 6 of housing 7 and on pilot shaft 12 to receive spring 28 which is assembled with cup member 31 on shaft 1. Upon alignment of the housing, not shown, carrying bearing unit 2 and the housing 7, spring 28 is readily positioned on drum 26 by relative rotation of shafts 1 and 3 in the opposite of the regular direction of drive.

Various modes of carrying out the invention are contemplated as within the scope of the following claims particularly pointing out and distinctly claiming the subject matter which is regarded as the invention.

I claim:

1. In a transmission mechanism, a planetary gear system including drive and driven gears and an intermediate planet gear in mesh therewith and having a planet carrier, separate cylindrical clutch means provided respectively on said carrier and said drive gear, a fixed brake surface, a coil spring carried by said clutch means and interengaging frictionally the same to lock the carrier and drive gear together whereby rotation of the drive gear effects corresponding rotation of the driven gear in one direction, one end of said spring being fixed relative to the planet carrier, and abutment means for selectively interrupting the rotation of the other end of the spring to expand the spring against said brake surface and thereby lock the planet carrier against rotation, whereupon rotation of the drive gear effects rotation of the driven gear in the opposite direction through the planet gears to provide a reverse drive.

2. In a planetary reverse gear transmission mechanism comprising a planetary gear system including drive and driven gears and an intermediate planet gear in mesh therewith and having a planet carrier, means for driving said drive gear, separate cylindrical clutch means provided respectively on said carrier and said drive gear, a coil spring carried by said clutch means and of a normal diameter to frictionally engage the same to lock the carrier and drive gear together whereby rotation of the drive gear effects the corresponding rotation of the driven gear in one direction, one end of said spring being fixed relative to the planet carrier, abutment means for selectively interrupting the rotation of the other end of the spring to expand the spring out of engagement with the drive gear, and cylindrical limiting means disposed to be engaged by the spring upon a given expansion to secure the planet carrier against rotation whereupon rotation of the drive gear effects rotation of the driven gear in the opposite direction through the planet gear to provide a reverse drive.

3. A transmission mechanism including in coaxial relationship a drive shaft and drive and driven gears and a planet gear carrier, said carrier having a planet gear in mesh with said drive and driven gears, said drive shaft and drive gear and planet gear carrier having aligned cylindrical portions disposed in series, a first coil spring carried by adjacent cylindrical portions of said drive shaft and drive gear and a second coil spring carrier by adjacent cylindrical portions of said drive gear and planet carrier, the end of the first spring carried by the drive gear being free and the end of the second spring carried by the planet carrier being fixed with respect to the carrier, abutment means movable selectively into positions interrupting the rotation of the corresponding other end of the first and second springs, the continued rotation of the drive shaft serving to expand the respective springs, the expansion of said first spring effecting its release from the drive shaft and providing the nonrotation of the driven gear and the expansion of said second spring effecting its release from said drive gear and further serving to cushion the change of rotation of the drive gear, and fixed cylindrical limiting means disposed to be engaged by the second spring upon a given expansion whereupon the positive securement of the planet carrier against rotation is effected and rotation of the drive gear effects rotation of the driven gear in the opposite direction through the planet gears to provide a reverse drive.

4. In a planetary reverse gear transmission mechanism comprising a planetary gear system including drive and driven gears and an intermediate planet gear in mesh therewith and having a planet carrier, means for driving said drive gear, separate cylindrical clutch means provided respectively on said carrier and said drive gear, a coil spring carried by said clutch means and of a normal diameter to frictionally engage the same whereby rotation of the drive gear effects the corresponding rotation of the driven gear in one direction, one end of said spring being fixed relative to the planet carrier, abutment means for selectively interrupting the rotation of the other end of the spring, the expansion of said spring serving to cushion the change of gear rotation to reverse drive, a housing for the transmission mechanism and having a cylindrical casing enclosing a part of said spring, and a cylindrical limiting sleeve carried by said carrier, said casing and sleeve being disposed to be engaged by the spring upon a given expansion whereupon the positive securement of the planet carrier against rotation is effected by said spring and abutment means.

5. A transmission mechanism including in coaxial relationship drive and driven shafts and a pilot shaft carried by and between said drive and driven shafts and rotatable independently of one thereof, a driven gear associated with said driven shaft, a drive gear and a planet carrier having a planet gear in mesh with said drive and driven gears, said drive shaft and drive gear and planet carrier having aligned cylindrical portions disposed in series, a first coil spring carried by adjacent cylindrical portions of said drive shaft and drive gear and a second coil spring carried by adjacent cylindrical portions of said drive gear and planet carrier, the end of the first spring carried by the drive gear being free and the end of the second spring carried by the planet carrier being fixed with respect to the carrier, abutment means movable selectively into positions interrupting the rotation of the corresponding other end of the first or second spring with the continued rotation of the drive shaft serving to expand the respective spring, the expansion of said first spring effecting its release from the drive shaft and providing the non-rotation of the driven gear and the expansion of said second spring effecting its release from said drive gear and further serving to cushion the change of rotation of the driven gear, a housing, said drive gear and planet carrier being rotatably assembled and disposed on said pilot shaft extending through said housing, said housing having a cylindrical casing enclosing part of said second spring, and a cylindrical limiting sleeve carried by said carrier, said casing and sleeve being disposed to be engaged by said second spring upon a given expansion whereupon the positive securement of the planet carrier against rotation is effected by said spring and abutment means.

6. In a transmission mechanism including in coaxial relationship drive and driven gears, a pilot shaft between said gears and rotatable independently of at least one thereof, a planet carrier having a planet gear in mesh with said drive and driven gears, said drive gear and planet gear carrier having adjacent and aligned cylindrical portions, means for driving said drive gear, a coil spring carried by said cylindrical portions of said drive gear and planet carrier, the end of said spring carried by the planet carrier being fixed with respect to the carrier, abutment means movable selectively into a position interrupting the rotation of the corresponding other end of the spring with the continued rotation of the drive gear serving to expand the spring, the expansion of said spring effecting its release from said drive gear and further serving to cushion the change of rotation of the driven gear, a housing, said planet carrier being rotatably assembled and disposed on said pilot shaft extending through said housing having a cylindrical casing enclosing part of said spring, and a cylindrical limiting sleeve carried by said carrier, said casing and sleeve being disposed to be engaged by said spring upon a given expansion whereupon the positive securement of the planet carrier against rotation is effected by said spring and abutment means.

7. A transmission mechanism including in coaxial relationship a drive shaft and drive and driven gears and a planet gear carrier, said carrier having a planet gear in mesh with said drive gear and driven carrier, said drive shaft and drive and planet gears having aligned cylindrical portions disposed in series, a first coil spring carried by adjacent cylindrical portions of said drive shaft and drive gear and adapted to frictionally engage and lock the shaft and gear together and a second coil spring carried by adjacent cylindrical portions of said drive gear and planet carrier and adapted to frictionally engage and lock the drive gear and carrier together, the end of the first spring carried by the drive gear being free and the end of the second spring carried by the planet carrier being fixed with respect thereto, a fixed spring expansion limiting surface, and abutment means movable selectively into positions interrupting the rotation of the corresponding other end of the first and second springs to effect expansion of the respective springs, with expansion of the first coil spring disengaging the drive shaft and drive gear to provide for relative movement therebetween and thus provide a neutral position to the transmission mechanism and with expansion of the second coil spring disengaging the drive gear and planet carrier to provide for relative movement therebetween and braking of the carrier by contact of said second spring against said braking surface and thus provide a reverse drive wherein rotation of the drive gear effects rotation of the driven gear in the opposite direction through the planet gears to provide a reverse drive.

References Cited in the file of this patent

UNITED STATES PATENTS

| | | |
|---|---|---|
| 2,073,408 | Litchfield | Mar. 9, 1937 |
| 2,189,109 | Hacker | Feb. 6, 1940 |
| 2,298,970 | Russell et al. | Oct. 13, 1942 |
| 2,475,432 | Marihart | July 5, 1949 |

FOREIGN PATENTS

| | | |
|---|---|---|
| 23,084 | Great Britain | June 20, 1907 |
| 551,316 | Great Britain | Feb. 17, 1943 |

UNITED STATES PATENT OFFICE
CERTIFICATE OF CORRECTION

Patent No. 2,886,985                                May 19, 1959

James A. Meyer

It is hereby certified that error appears in the printed specification of the above numbered patent requiring correction and that the said Letters Patent should read as corrected below.

Column 3, line 75, after "and" and before "cylindrical" insert --fixed --; column 4, line 27, for "drive" read -- driven --; column 6, line 19, for "position to" read -- position for --.

Signed and sealed this 6th day of October 1959.

(SEAL)
Attest:

KARL H. AXLINE                                    ROBERT C. WATSON
Attesting Officer                                    Commissioner of Patents